US012658464B2

(12) United States Patent
Cao et al.

(10) Patent No.: US 12,658,464 B2
(45) Date of Patent: Jun. 16, 2026

(54) MODULE TRAY AND BATTERY PRODUCTION DEVICE

(71) Applicant: Contemporary Amperex Technology (Hong Kong) Limited, Hong Kong (CN)

(72) Inventors: Xin Cao, Ningde (CN); Jun Yang, Ningde (CN); Wei Cao, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 346 days.

(21) Appl. No.: 18/530,364

(22) Filed: Dec. 6, 2023

(65) Prior Publication Data
US 2024/0429428 A1 Dec. 26, 2024

Related U.S. Application Data

(63) Continuation of application No. PCT/CN2023/101751, filed on Jun. 21, 2023.

(51) Int. Cl.
*H01M 10/04* (2006.01)
*B25B 1/20* (2006.01)
*B25B 1/24* (2006.01)

(52) U.S. Cl.
CPC ........... *H01M 10/0404* (2013.01); *B25B 1/20* (2013.01); *B25B 1/2452* (2013.01); *B25B 1/2484* (2013.01)

(58) Field of Classification Search
CPC ........... H01M 10/0404; H01M 50/202; H01M 50/264; B25B 1/103; B25B 1/20; B25B 1/2452; B25B 1/2484; B25B 1/2489
See application file for complete search history.

(56) References Cited

U.S. PATENT DOCUMENTS

2015/0000740 A1 1/2015 Mizuo

FOREIGN PATENT DOCUMENTS

| CN | 204800128 U | 11/2015 |
|----|-------------|---------|
| CN | 204872614 U | 12/2015 |
| CN | 210232053 U | 4/2020 |
| CN | 111370746 A | 7/2020 |
| CN | 213415449 U | 6/2021 |
| CN | 213594761 U | 7/2021 |

(Continued)

OTHER PUBLICATIONS

Machine Translation of CN 216084990 U (Year: 2022).*

(Continued)

*Primary Examiner* — Christopher J. Besler
(74) *Attorney, Agent, or Firm* — ANOVA LAW GROUP, PLLC

(57) ABSTRACT

This application provides a module tray and a battery production device. The module tray includes: a tray body; a reference member mounted on the tray body and configured for supporting and positioning a battery module in a first direction; a sliding member slidably mounted on the tray body along the first direction and configured to clamp the battery module in cooperation with the reference member; and an adjustment mechanism connected to the sliding member, where the adjustment mechanism is configured to drive the sliding member to move along the first direction and lock a position of the sliding member, and the adjustment mechanism is mounted on the tray body.

19 Claims, 9 Drawing Sheets

(56)  References Cited

FOREIGN PATENT DOCUMENTS

| CN | 214336761 | U | 10/2021 |
| CN | 215680752 | U | 1/2022 |
| CN | 216084990 | U | 3/2022 |
| CN | 114883626 | A | 8/2022 |
| CN | 217529744 | U | 10/2022 |
| CN | 218472148 | U | 2/2023 |
| CN | 218504300 | U | 2/2023 |
| CN | 218556880 | U | 3/2023 |
| CN | 218930134 | U | 4/2023 |
| WO | 2022218122 | A1 | 10/2022 |
| WO | 2022233196 | A1 | 11/2022 |

OTHER PUBLICATIONS

State Intellectual Property Office of China Notice of the Granting of a Patent Right for an Invention for Application No. 202380060564.1 Nov. 6, 2025 6 pages (including translation).

The World Intellectual Property Organization (WIPO) International Search Report for PCT/CN2023/101751 Oct. 24, 2023 8 Pages (including translation).

The European Patent Office (EPO) The Partial Supplementary European Search Report for Application No. 23809949.3 Jul. 12, 2024 13 Pages.

* cited by examiner

MODULE TRAY AND BATTERY PRODUCTION DEVICE

CROSS-REFERENCE TO RELATED APPLICATION

This application is a continuation of International Application No. PCT/CN2023/101751, filed on Jun. 21, 2023, the entire content of which is incorporated herein by reference.

TECHNICAL FIELD

This application pertains to the field of battery technologies and more specifically relates to a module tray and a battery production device.

BACKGROUND

Energy conservation and emission reduction are crucial to the sustainable development of the automobile industry. Electric vehicles, with their advantages in energy conservation and emission reduction, have become an important part of sustainable development of the automobile industry. For electric vehicles, battery technology is an important factor in connection with their development.

In a battery production process, it is necessary to use a tray to support battery modules for assembly in a production line. However, battery modules of different models are typically used in different occasions, and accordingly, the battery modules are different in length. This requires to use trays of various models during production, resulting in high costs and inconvenience of use.

SUMMARY

Embodiments of this application are intended to provide a module tray and a battery production device, so as to solve the problems of many tray models, high costs, and inconvenient use of a battery production device in the related art due to the need for designing corresponding trays for battery modules of different models.

According to a first aspect, an embodiment of this application provides a module tray. The module tray includes:

a tray body;

a reference member mounted on the tray body and configured for supporting and positioning a battery module in a first direction;

a sliding member slidably mounted on the tray body along the first direction and configured to clamp the battery module in cooperation with the reference member; and an adjustment mechanism connected to the sliding member, where the adjustment mechanism is configured to drive the sliding member to move along the first direction and lock a position of the sliding member, and the adjustment mechanism is mounted on the tray body.

In the technical solution of this embodiment of this application, providing the reference member for positioning the battery module in the first direction facilitates subsequent movement and processing of the battery module. In addition, providing the adjustment mechanism to adjust a position of the sliding member relative to the reference member allows the sliding member to clamp battery modules with different lengths in cooperation with the reference member, featuring high adaptability, reducing models of the module tray, lowering costs, and facilitating ease of use.

In some embodiments, the sliding member includes a support seat and a clamping block, the clamping block being mounted on the support seat, the support seat being connected to the adjustment mechanism, and the support seat being slidably mounted on the tray body along the first direction.

Providing the support seat facilitates supporting the clamping block. In addition, providing the clamping block facilitates cooperatively abutting against the battery module, reducing the damage to the battery module, and also facilitates clamping the battery module in cooperation with the reference member.

In some embodiments, the sliding member further includes a connection seat, the connection seat being mounted on the support seat, and the clamping block being detachably mounted on the connection seat.

With the connection seat provided, it is convenient to mount the clamping block on the support seat. In addition, with the clamping block detachably mounted on the connection seat, corresponding clamping blocks can be replaced according to battery modules of different models, facilitating cooperatively abutting against the battery module, reducing the damage to the battery module, and also facilitating clamping the battery module in cooperation with the reference member.

In some embodiments, the sliding member further includes a support member slidably supporting the clamping block along the first direction, the support member being slidably mounted on the support seat, where a buffer is disposed between the support seat and the clamping block.

With the clamping block slidably mounted on the support seat via the support member and the buffer disposed between the support seat and the clamping block, when the clamping block abuts against the battery module, the buffer can provide elastic buffering to prevent hard contact between the clamping block and the battery module to some extent, reducing the damage to the battery module, thereby well protecting the battery module.

In some embodiments, the buffer includes at least one of a spring, an elastic piece, and an elastic gasket.

The buffer uses at least one of the spring, the elastic piece, and the elastic gasket, featuring simple structure, low costs, and easy assembly.

In some embodiments, the support member includes a guide rod, the support seat is provided with a sliding hole, the guide rod slidably runs through the sliding hole, and the clamping block is supported on the guide rod.

The support seat is provided with the sliding hole, the guide rod is used for supporting the clamping block, and the guide rod is slidably inserted into the sliding hole, so that the clamping block is slidably mounted on the support seat along the first direction, featuring simple structure and easy assembly.

In some embodiments, the sliding member further includes a limiting member, the limiting member being configured to stop the support seat, and the limiting member being mounted at an end of the guide rod away from the clamping block.

The provision of the limiting member can reduce the risk of the guide rod falling off when the guide rod slides in the sliding hole, facilitating the use of the module tray.

In some embodiments, a guide sleeve is slidably mounted on the guide rod, the guide sleeve being mounted in the sliding hole.

The guide sleeve is provided in the sliding hole to stably support the guide rod and guide the guide rod to move stably, thereby driving the clamping block to move stably.

In some embodiments, the sliding member is provided with a first avoidance groove on a surface facing the reference member, and the reference member is provided with a second avoidance groove corresponding to the first avoidance groove on a surface facing the sliding member.

With the first avoidance groove provided on the sliding member and the second avoidance groove provided on the reference member, a binding member such as a binding strap can be used to run through the first avoidance groove and the second avoidance groove to bind and restrain the battery module when the sliding member and the reference member cooperatively clamp the battery module.

In some embodiments, the module tray further includes an elongated seat, the elongated seat being configured to support the battery module, the elongated seat being mounted on the tray body, and the elongated seat extending along the first direction.

The elongated seat is disposed on the tray body to support the battery module, helping the sliding member and the reference member to cooperatively clamp the battery module.

In some embodiments, a height of the sliding member protruding from the elongated seat is less than a height of the battery module, and a height of the reference member protruding from the elongated seat is less than the height of the battery module.

Setting the heights of the sliding member and the reference member protruding from elongated seat to be less than the height of the battery module can facilitate mounting of a steel strip at the top of the battery module.

In some embodiments, two opposite sides of the tray body are each provided with a support fixture, the support fixture being configured to support a side plate.

The support fixture is disposed on the tray body to support the side plate, facilitating mounting of the side plate to the battery module in a subsequent procedure, thereby improving the battery assembly efficiency.

In some embodiments, the support fixture includes two support blocks, each of the support blocks being provided with an accommodating groove for accommodating a corresponding end of the side plate, and the two support blocks being configured to cooperatively support two opposite ends of the side plate.

The support block is provided with the accommodating groove, and the support fixture is provided with the two support blocks to support the two opposite ends of the side plate, thereby stably supporting the side plate and facilitating subsequent use of the side plate.

In some embodiments, the accommodating groove is provided in plurality on each of the support blocks to adapt to side plates of various models, and the plurality of accommodating grooves provided on at least one of the support blocks are different in length.

The plurality of accommodating grooves with different lengths are provided on the support block to adapt to side plates of various length models, so that corresponding side plates can be inserted into the support fixtures according to battery modules of different models, facilitating subsequent assembly and improving the battery manufacturing efficiency.

In some embodiments, at least one of the support blocks is provided with an open groove for accommodating a bent edge of an end of the side plate, the open groove being in communication with the accommodating groove.

The open groove is provided on the support block to accommodate the bent edge of the end of the side plate, helping to position and support the side plate.

In some embodiments, the support fixture further includes at least one middle block, where the middle block is configured to cooperatively support a middle region of the side plate, and the middle block is provided with a positioning groove for insertion of the side plate.

The middle block is provided to support the middle region of the side plate and support the side plate more stably in cooperation with the two support blocks.

In some embodiments, the support fixtures on two opposite sides of the tray body are in rotational symmetry with respect to a central axis, the central axis being perpendicular to the tray body and running through a geometric center of the tray body.

The side plates on two sides of the battery module are disposed opposite each other. In this way, the support fixtures on two sides of the tray body are in rotational symmetry, so that two side plates can be supported opposite each other on the tray body, facilitating assembly and improving efficiency.

In some embodiments, the adjustment mechanism includes a screw rod disposed along the first direction, a nut mounted on the screw rod, and support bases rotatably supporting two opposite ends of the screw rod, where the sliding member is connected to the nut, and the support base is mounted on the tray body.

With the screw rod and the nut provided, the position of the sliding member can be accurately adjusted, helping the sliding member to clamp or release the battery module in cooperation with the reference member. In addition, when the sliding member clamps the battery module in cooperation with the reference member, the sliding member is subjected to the counteraction from the battery module so as to drive the nut to abut against the screw rod, such that the nut is locked on the screw rod, thereby positioning the sliding member for helping the sliding member to stably clamp the battery module in cooperation with the reference member.

In some embodiments, an end of the screw rod is provided with a plug, the plug being configured to connect an external rotatable driving tool.

The plug is disposed at an end of the screw rod to connect the external driving tool, so that the screw rod can be driven by the external driving tool to rotate so as to adjust positions of the nut and the sliding member.

In some embodiments, the adjustment mechanism further includes a guide assembly, the guide assembly being mounted on the tray body, and the guide assembly being configured to support and guide the sliding member to move along the first direction.

The guide assembly being provided can not only stably support the sliding member but also flexibly and stably guide the sliding member to move along the first direction.

In some embodiments, the guide assembly includes a guide rail mounted on the tray body and a sliding block slidably mounted on the guide rail, the sliding block being connected to the sliding member;

and/or the guide assembly includes a guide rod and a guide sleeve slidably fitting around the guide rod, the guide sleeve being connected to the sliding member, and the guide rod being supported on the tray body.

The sliding member is supported by the sliding block and the sliding block is guided by the guide rail to move, so as to stably support the sliding member and guide the sliding member to move flexibly, featuring simple structure and low costs.

The sliding member is supported by the guide sleeve and the guide sleeve is guided by the guide rod to move, so as to stably support the sliding member and guide the sliding member to move flexibly, featuring simple structure and low costs.

In some embodiments, the reference member includes a base and a reference block, the base being fixed to the tray body, and the reference block being detachably mounted on the base.

The base is provided to support the reference block. The reference block is provided and detachably mounted on the base so as to cooperatively abut against the battery module. In addition, corresponding reference blocks are replaced according to the models of the battery modules, reducing the damage to the battery module. It is also convenient for the reference block to clamp the battery module in cooperation with the sliding member.

In some embodiments, the module tray further includes a clamping mechanism and two clamping plates, the clamping mechanism being configured to support and drive the two clamping plates to cooperatively clamp and fix the battery module, and the clamping mechanism being mounted on the tray body.

The clamping mechanism is provided to push the two clamping plates to cooperatively clamp two opposite sides of the battery module, so that the shake of the battery module can be alleviated during movement, facilitating the subsequent processing and manufacturing. In addition, the two clamping plates, the reference member, and the sliding member can also cooperatively clamp four sides of the battery module so as to stably support the battery module, better alleviating the shake of the battery module.

According to a second aspect, an embodiment of this application provides a battery production device including the module tray according to the foregoing embodiments.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

To describe the technical solutions in the embodiments of this application more clearly, the following briefly describes the accompanying drawings required for describing the embodiments or exemplary technologies. Apparently, the accompanying drawings in the following description show merely some embodiments of this application, and persons of ordinary skill in the art may still derive other drawings from these accompanying drawings without creative efforts.

Figure 1:
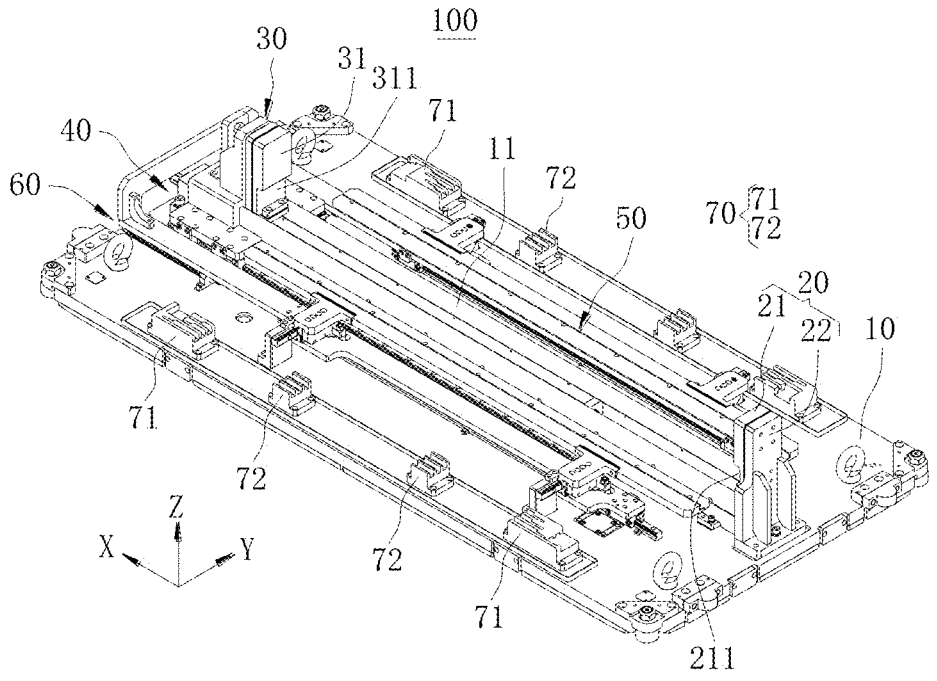
FIG. 1 is a schematic structural diagram of a module tray according to some embodiments of this application.

100. module tray;

10. tray body; 11. elongated seat;

20. reference member; 21. reference block; 211. second avoidance groove; 22. base;

30. sliding member; 31. clamping block; 311. first avoidance groove; 32. support seat; 321. sliding hole; 33. connection seat; 34. support member; 341. guide rod; 342. guide sleeve; 35. limiting member; 36. buffer; 37. first gasket;

40. adjustment mechanism; 41. screw rod; 411. plug; 42. nut; 43. support base; 44. guide assembly; 441. guide rail; 442. sliding block;

50. clamping plate; 51. mounting seat; 52. gripping plate;

60. clamping mechanism; 61. support member; 62. pushing structure; 621. pushing plate; 622. dragging structure; 6221. slide way; 6222. roller; 6223. eccentric member; 623. connection plate; 624. elastic pushing member; 63. first guide assembly; 631. first guide rail; 632. first sliding block; 64. second guide assembly; 641. second guide rail; 642. second sliding block; 65. buffering member; 66. elastic member; 67. pushing member;

70. support fixture; 71. support block; 711. accommodating groove; 712. open groove; 72. middle block; 721. positioning groove;

90. battery module; 91. battery cell; 92. binding member; 93. steel strip; and 94. side plate.

DESCRIPTION OF EMBODIMENTS

To describe the technical problems solved by this application, technical solutions, and beneficial effects of this application more clearly, the following further describes this application in detail with reference to the embodiments and accompanying drawings. It should be understood that the specific embodiments described herein are merely used to explain this application but are not intended to limit this application.

Unless otherwise defined, all technical and scientific terms used herein shall have the same meanings as commonly understood by those skilled in the art to which this application relates. The terms used herein are intended to merely describe the specific embodiments rather than to limit this application. The terms "include", "comprise", and "have" and any other variations thereof in the specification, claims and brief description of drawings of this application are intended to cover non-exclusive inclusions.

In the description of the embodiments of this application, the terms "first", "second", and the like are merely intended to distinguish between different objects, and shall not be understood as any indication or implication of relative importance or any implicit indication of the number, sequence or primary-secondary relationship of the technical features indicated. Therefore, a feature limited by "first" or "second" may explicitly or implicitly include one or more such features.

In this specification, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that some embodiments described herein may be combined with other embodiments.

In the description of the embodiments of this application, the term "and/or" is only an associative relationship for describing associated objects, indicating that three relationships may be present. For example, A and/or B may indicate the following three cases: presence of only A, presence of both A and B, and presence of only B. In addition, the character "/" in this specification generally indicates an "or" relationship between contextually associated objects.

In the description of the embodiments of this application, the term "a plurality of" means more than two (inclusive). Similarly, "a plurality of groups" means more than two (inclusive) groups, and "a plurality of pieces" means more than two (inclusive) pieces. "A plurality of" means one or more unless otherwise specifically stated.

In the description of the embodiments of this application, the orientations or positional relationships indicated by the technical terms "center", "longitudinal" "transverse", "length", "width", "thickness", "upper", "lower", "front", "rear", "left", "right", "vertical", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of the description of the embodiments of this application rather than indicating or implying that the means or components mentioned must have specific orientations, or must be constructed or manipulated according to specific orientations, and therefore shall not be construed as any limitations on embodiments of this application.

In the description of the embodiments of this application, unless otherwise specified and defined explicitly, the technical terms "mounting", "connection", "join", and "fastening" should be understood in their general senses. For example, they may refer to a fixed connection, a detachable connection, or an integral connection, may refer to a mechanical connection or an electrical connection, and may refer to a direct connection, an indirect connection via an intermediate medium, an internal communication between two elements, or an interaction between two elements. Persons of ordinary skill in the art can understand specific meanings of these terms in the embodiments of this application as appropriate to specific situations.

In the description of the embodiments of this application, unless otherwise specified and defined explicitly, when a component is referred to as being "fastened to" or "disposed on" another component, it may be directly or indirectly fastened to the another component. When a component is referred to as being "connected to" another component, it may be directly or indirectly connected to the another component.

In the description of the embodiments of this application, unless otherwise specified and defined explicitly, the technical term "proximity" means positional proximity. For example, for three components $A_1$, $A_2$, and B, if a distance between $A_1$ and B is greater than a distance between $A_2$ and B, $A_2$ is closer to B than $A_1$, that is, $A_2$ is in proximity to B, or B is in proximity to $A_2$. For another example, for a plurality of components C: $C_1$, $C_2$, . . . , and $C_N$, if one component C, for example, $C_2$, is closer to a component B than other components C, B is in proximity to $C_2$, or $C_2$ is in proximity to B.

In this application, a battery cell may include a lithium-ion secondary battery, a lithium-ion primary battery, a lithium-sulfur battery, a sodium-lithium-ion battery, a sodium-ion battery, a magnesium-ion battery, or the like. This is not limited in the embodiments of this application. The battery cell may be cylindrical, flat, cuboid, or of other shapes, which is not limited in the embodiments of this application either. Battery cells are typically divided into three types by packaging method: cylindrical cell, prismatic cell, and pouch cell. The type of battery is not limited in the embodiments of this application either.

A battery module mentioned in the embodiments of this application typically refers to a module formed by packaging a plurality of battery cells using a housing frame. The battery module typically includes a plurality of battery cells, end plates, and side plates, where the plurality of battery cells are arranged along a thickness direction, two end plates are used for clamping two ends of these battery cells in the thickness direction, and the side plates are used for clamping two opposite sides of these battery cells to fix these battery cells. To improve stability, in some embodiments, the battery module further includes a binding member such as a binding strap to bind and fix these battery cells. The battery module may be assembled directly to form a battery or may be assembled to form a battery pack.

The battery mentioned in the embodiments of this application is a single physical module that includes one or more battery cells for providing a higher voltage and capacity. For example, the battery mentioned in this application may include a battery module, a battery pack, or the like. A battery typically includes a box configured to enclose one or more battery cells. The box can prevent liquids or other foreign matter from affecting charging or discharging of the battery cell. In some cases, the battery cell may alternatively be used directly, that is, the battery may alternatively include no box, which is not limited herein.

In the battery module, under a condition that a plurality of battery cells are provided, the plurality of battery cells may be connected in series, parallel, or series-parallel, where being connected in series-parallel means a combination of series and parallel connections of the plurality of battery cells. The plurality of battery cells may be directly connected in series, parallel, or series-parallel, and then an entirety of the plurality of battery cells is accommodated in the box. The battery may alternatively be formed by a plurality of battery cells being connected in series, parallel, or series-parallel first to form a battery module, and then a plurality of battery modules being connected in series, parallel, or series-parallel to form an entirety which is accommodated in the box. The battery may further include other structures. For example, the battery may further include a busbar configured to implement electrical connection between the plurality of battery cells.

As battery modules typically used in different occasions are different in model, for example, battery modules used in electric vehicles and trucks are typically different in model, battery modules used in trucks of different sizes such as light trucks and heavy trucks may also be different in model. Battery modules are different in model may mean that battery cells used for battery modules are different in size, or that battery cells used for battery modules are different in quantity, which ultimately results in different lengths of battery modules of different models. In a battery module assembly process, it is necessary to use a tray to support battery modules, facilitating assembly in a production line. However, due to different lengths of battery modules, it is necessary to design and use corresponding trays in a targeted manner during production to stably support the battery modules for production and processing, resulting in various models and sizes of the trays, high costs, and inconvenience of use.

Based on the above considerations, to solve the problem that during production of battery modules, it is necessary to design corresponding trays for battery modules of different models, resulting in various models of the trays, high costs, and inconvenience of use, an embodiment of this application provides a model tray. A reference member is disposed at an end of a tray body, a sliding member is mounted on the tray body, and an adjustment mechanism is provided to adjust a distance of the sliding member relative to the reference member. This allows for adaptive clamping of battery models with different lengths and adaptive support for battery modules of various models, reducing models of the module tray and reducing costs. In addition, when in use, the module tray can be adapted to battery modules of various models and is also easy to use.

The module tray disclosed in this embodiment of this application can be used in an assembly line for battery module, in an inspection line for battery module, or in a battery production device such as a transfer apparatus of battery module.

Figure 2:
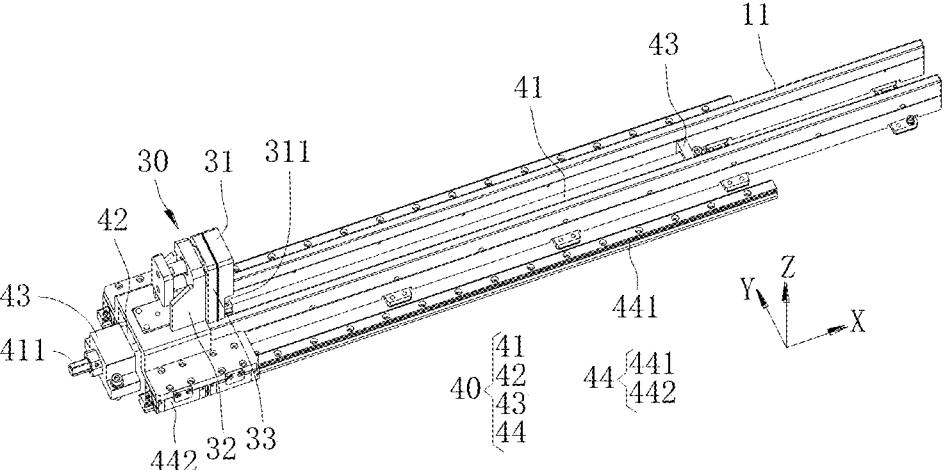
FIG. 2 is a first schematic structural diagram of a combination of a reference member, a sliding member, and an adjustment mechanism in FIG. 1.
Figure 3:
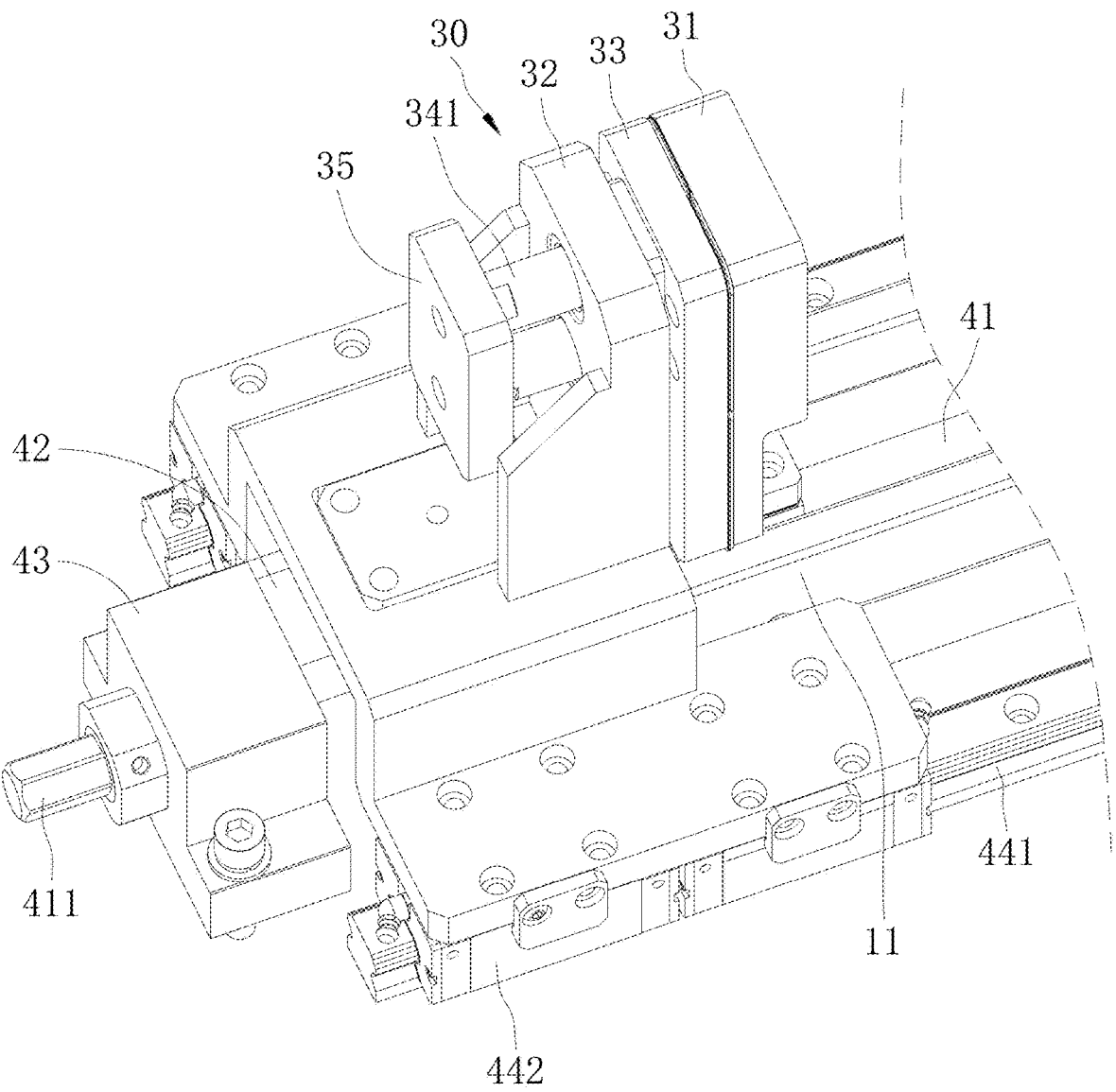
FIG. 3 is a schematic partial structural diagram of the sliding member in FIG. 2.
Figure 4:
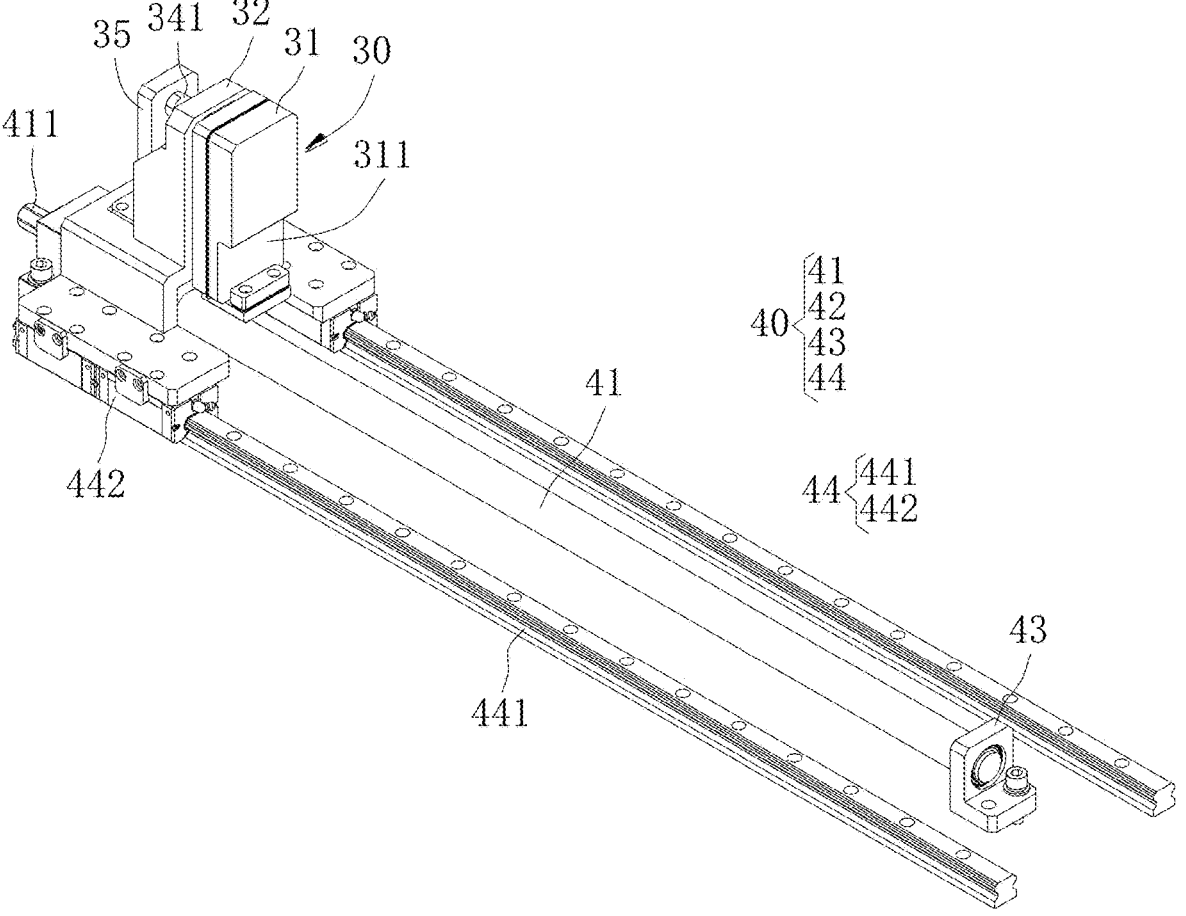
FIG. 4 is a second schematic structural diagram of the combination of the reference member, the sliding member, and the adjustment mechanism in FIG. 1.
Figure 5:
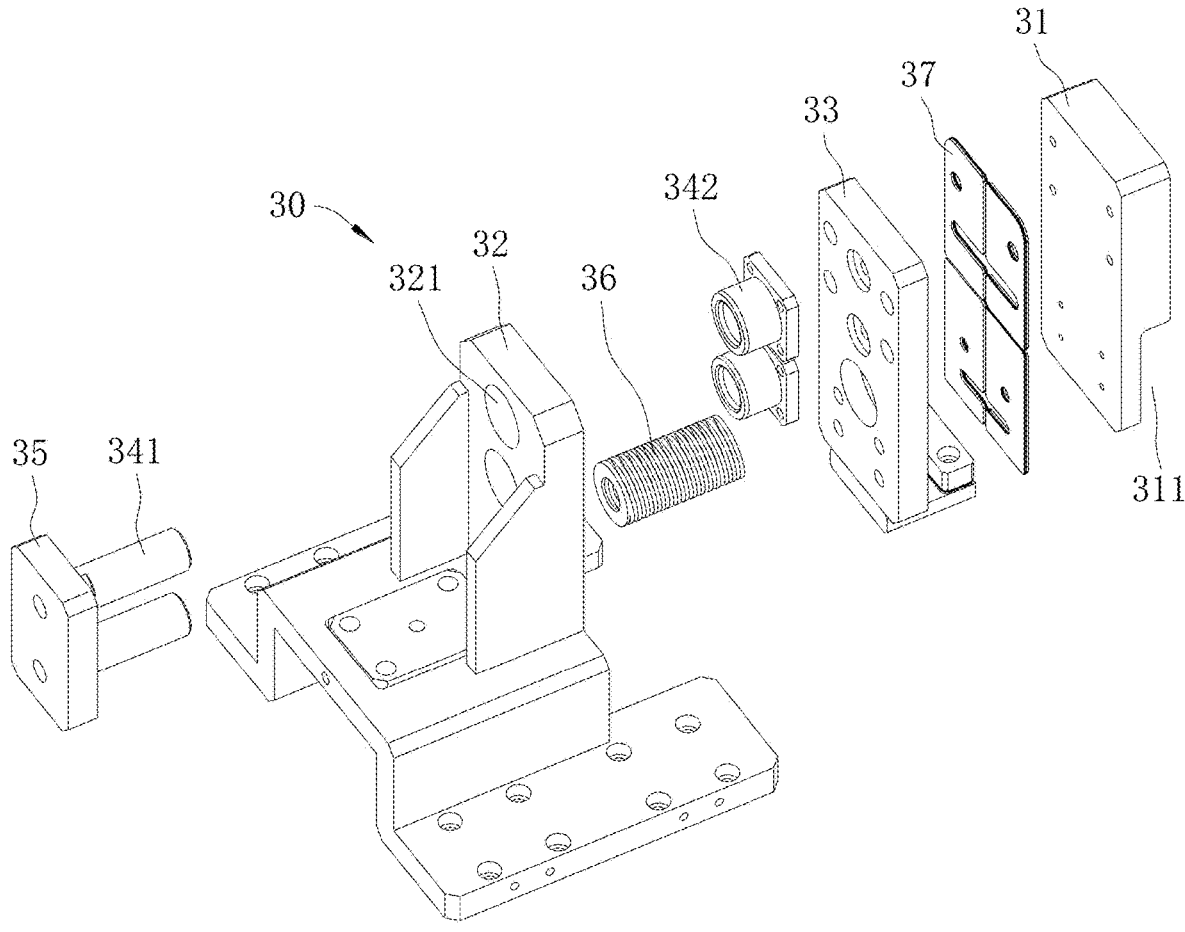
FIG. 5 is a schematic structural exploded view of the sliding member in FIG. 4.
Figure 6:
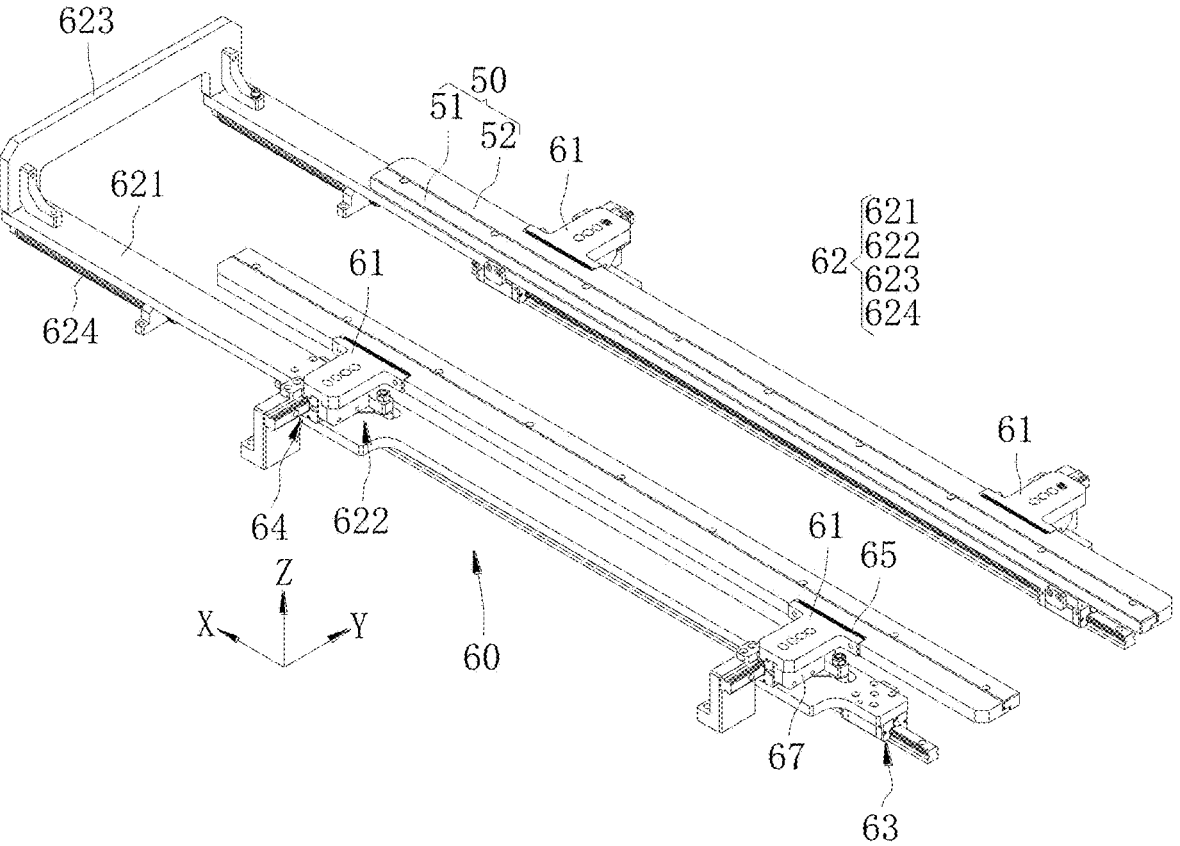
FIG. 6 is a schematic structural diagram of a clamping plate and a clamping mechanism in FIG. 1.
Figure 7:
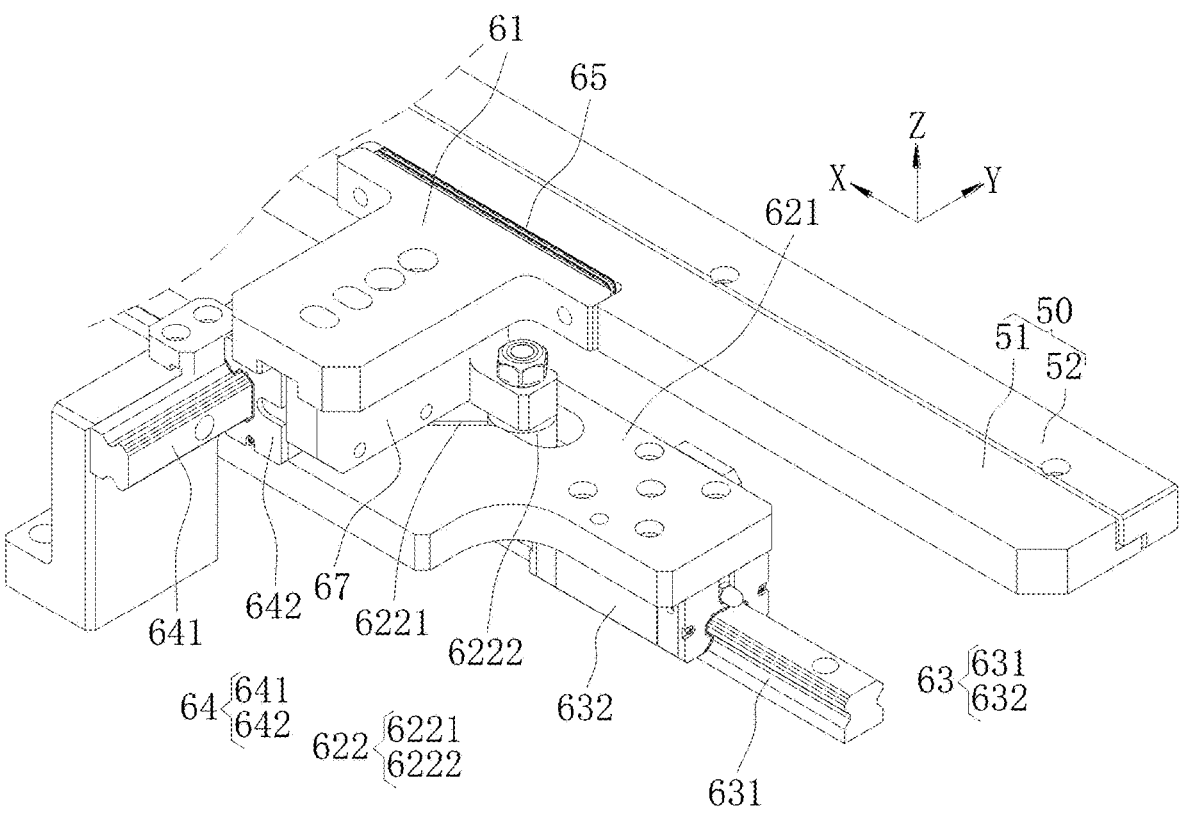
FIG. 7 is a schematic partial structural diagram of a pushing structure in FIG. 6.
Figure 8:
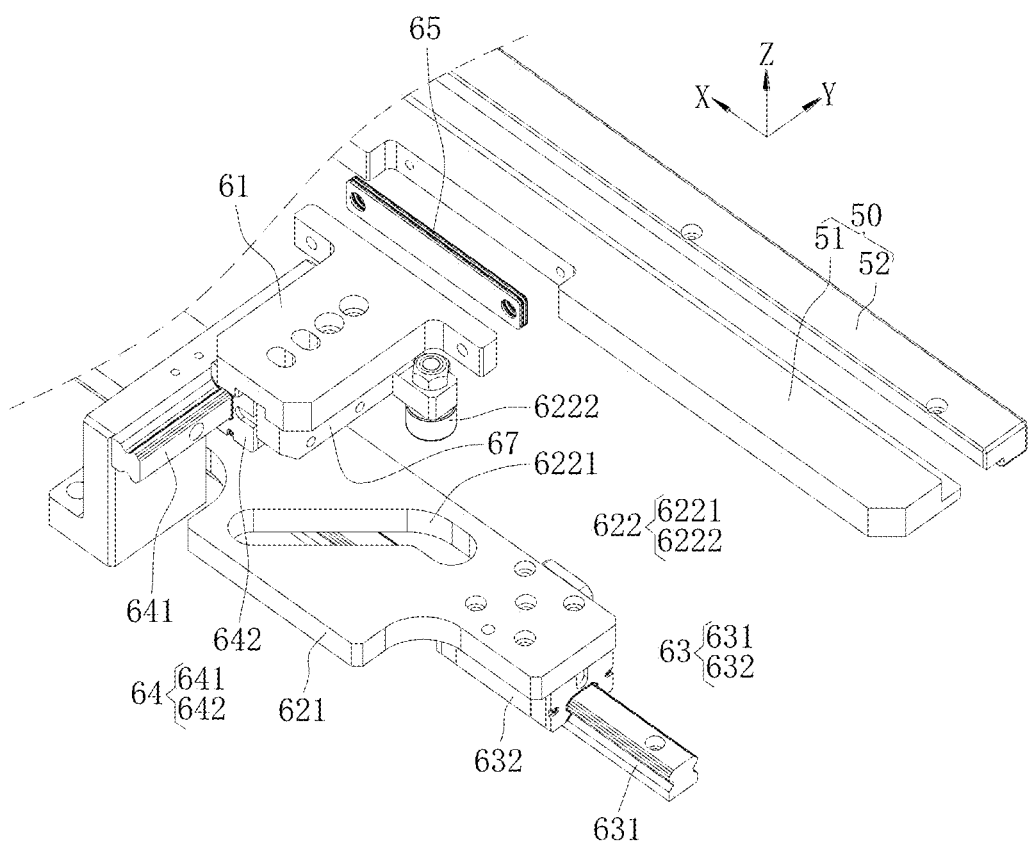
FIG. 8 is a schematic partial structural exploded view of the pushing structure in FIG. 7.
Figure 10:
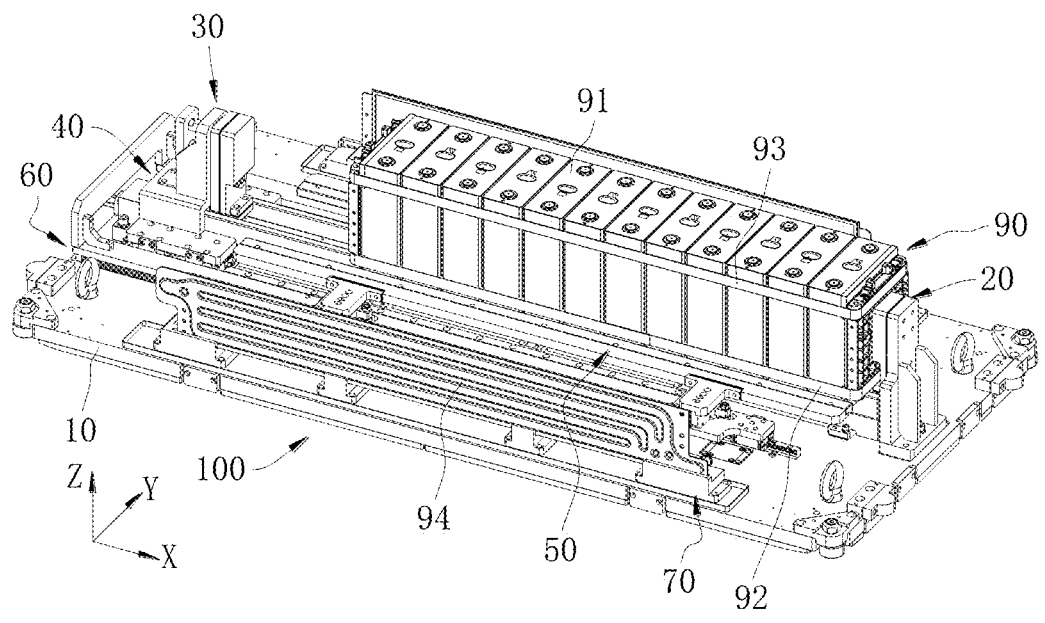
FIG. 10 is a schematic structural diagram of a module tray supporting a battery module according to some embodiments of this application.

Referring to FIG. 1 to FIG. 5 and FIG. 10, FIG. 1 is a schematic structural diagram of a module tray 100 according to some embodiments of this application. FIG. 2 is a schematic structural diagram of a combination of a reference member 20, a sliding member 30, and an adjustment mechanism 40 of the module tray 100 according to some embodiments of this application from one perspective. FIG. 3 is a schematic partial structural diagram of the sliding member 30 in FIG. 2. FIG. 4 is a schematic structural diagram of the combination of the reference member 20, the sliding member 30, and the adjustment mechanism 40 of the module tray 100 according to some embodiments of this application from another perspective. FIG. 5 is a schematic partial structural exploded view of the sliding member 30 of the module tray 100 according to some embodiments of this application. FIG. 10 is a schematic structural diagram of the module tray 100 supporting a battery module according to some embodiments of this application.

According to some embodiments of this application, this application provides a module tray 100 including: a tray body 10; a reference member 20 mounted on the tray body 10 and configured for supporting and positioning a battery module 90 in a first direction X; a sliding member 30 slidably mounted on the tray body 10 along the first direction X and configured to clamp the battery module 90 in cooperation with the reference member 20; and an adjustment mechanism 40 connected to the sliding member 30, where the adjustment mechanism 40 is configured to drive the sliding member 30 to move along the first direction X and lock a position of the sliding member 30, and the adjustment mechanism 40 is mounted on the tray body 10.

The tray body 10 refers to a body structure supporting other components of the module tray 100. The tray body 10 is typically a plate structure to facilitate assembly of other components of the module tray 100 and support the battery module 90. The tray body 10 is also easily supported on a production line to drive the battery module 90 to move.

The reference member 20 refers to a structural member configured to abut against the battery module 90 so as to restrict a position of the battery module 90 and provide a reference for positioning the battery module 90. With the reference member 20 provided, the reference position of the battery module 90 can be determined when the battery module 90 is placed on the tray body 10, so as to facilitate subsequent processing of the battery module 90.

The reference member 20 is mounted on the tray body 10, so that the reference member 20 is supported by the tray body 10, allowing the reference member 20 to easily stop the battery module 90.

The sliding member 30 refers to a structural member configured to abut against the battery module 90 and clamp and fix the battery module 90 in cooperation with the reference member 20.

The sliding member 30 being slidably mounted on the tray body 10 along the first direction X refers to that the sliding member 30 is capable of moving on the tray body 10 along the first direction X A distance between the sliding member 30 and the reference member 20 can be changed due to movement of the sliding member 30 on the tray body 10, so as to clamp and fix the battery module 90 or release the battery module 90.

The adjustment mechanism 40 refers to a mechanism configured to change a position of the sliding member 30 on the tray body 10 and capable of locking the sliding member 30 at an adjusted position. The adjustment mechanism 40 is mounted on the tray body 10, so that the adjustment mechanism 40 is supported by the tray body 10.

The sliding member 30 is adjusted by the adjustment mechanism 40 to move away from the reference member 20 along the first direction X. In this way, the battery module 90 can be placed on the tray body 10, and the sliding member 30 is then adjusted to move, allowing the sliding member 30 to clamp the battery module 90 in cooperation with the reference member 20. Then the position of the sliding member 30 is locked by the adjustment mechanism 40, so that the battery module 90 can be stably clamped by the sliding member 30 and the reference member 20, facilitating subsequent processing of the battery module 90. In addition, after the battery module 90 is processed, the adjustment mechanism 40 is capable of adjusting the sliding member 30 to move away from the reference member 20 so as to release the battery module 90.

The first direction X refers to a direction parallel to a plane on which the tray body 10 is located. As shown in FIG. 1, the first direction X may be a length direction of the tray body 10, or certainly a width direction of the tray body 10.

In the technical solution of this embodiment of this application, providing the reference member 20 for positioning the battery module 90 in the first direction X facilitates subsequent movement and processing of the battery module 90. In addition, providing the adjustment mechanism 40 to adjust a position of the sliding member 30 relative to the reference member 20 allows the sliding member 30 to clamp battery modules 90 with different lengths in cooperation with the reference member 20, featuring high adaptability, reducing models of the module tray 100, lowering costs, and facilitating ease of use.

In some embodiments, the sliding member 30 includes a support seat 32 and a clamping block 31, the clamping block 31 being mounted on the support seat 32, the support seat 32 being connected to the adjustment mechanism 40, and the support seat 32 being slidably mounted on the tray body 10 along the first direction X.

The clamping block 31 refers to a structural member configured to abut against and clamp the battery module 90 in cooperation with the reference member 20.

The support seat 32 refers to a structural member configured to support the clamping block 31. The support seat 32 is slidably mounted on the tray body 10 along the first direction X, so that a position of the support seat 32 in the first direction X can be adjusted, and thus a position of the clamping block 31 in the first direction X can be adjusted.

The support seat 32 is connected to the adjustment mechanism 40, so that the positions of the support seat 32 and the clamping block 31 in the first direction X are changed by the adjustment mechanism 40, allowing the clamping block 31 to clamp the battery module 90 in cooperation with the reference member 20.

Providing the support seat 32 facilitates supporting the clamping block 31. In addition, providing the clamping block 31 facilitates cooperatively abutting against the battery module 90, reducing the damage to the battery module 90, and also facilitates clamping the battery module 90 in cooperation with the reference member 20.

In some embodiments, the sliding member 30 further includes a connection seat 33, the connection seat 33 being mounted on the support seat 32, and the clamping block 31 being detachably mounted on the connection seat 33.

The connection seat 33 is an intermediate structural member configured to support the clamping block 31 and capable of being connected to the support seat 32 so as to support the clamping block 31 on the support seat 32. The connection seat 33 is provided to connect the clamping block 31 and support the clamping block 31 on the support seat 32.

The clamping block 31 being detachably mounted on the connection seat 33 refers to that the clamping block 31 is detachably connected to the connection seat 33, for example, the clamping block 31 can be connected to the connection seat 33 via a structural member such as a bolt and a snap. In this way, the mounting of the clamping block 31 can be facilitated, and corresponding clamping blocks 31 can be replaced according to battery modules 90 of different models.

With the connection seat 33 provided, it is convenient to mount the clamping block 31 on the support seat 32. In addition, with the clamping block 31 detachably mounted on the connection seat 33, corresponding clamping blocks 31 can be replaced according to battery modules 90 of different models, facilitating cooperatively abutting against the battery module 90, reducing the damage to the battery module 90, and also facilitating clamping the battery module 90 in cooperation with the reference member 20.

In some embodiments, the sliding member 30 further includes a support member 34 slidably supporting the clamping block 31 along the first direction X, the support member 34 being slidably mounted on the support seat 32, where a buffer 36 is disposed between the support seat 32 and the clamping block 31.

The support member 34 refers to a structural member slidably mounted on the support seat 32. To be specific, the support member 34 can be supported on the support seat 32, and the support member 34 is capable of sliding on the support seat 32 along the first direction X.

The clamping block 31 is mounted on the support member 34, the clamping block 31 is supported by the support member 34, and the clamping block 31 is slidably mounted on the support seat 32 along the first direction X, so that the clamping block 31 can move along the first direction X relative to the support seat 32.

The buffer 36 refers to a structure capable of providing an elastic counteraction force and generating elastic deformation when subjected to an extrusion force.

The buffer 36 is disposed between the support seat 32 and the clamping block 31, so that when the clamping block 31 abuts against the battery module 90, the elastic deformation of the buffer 36 can buffer the clamping block 31 and thus well protect the battery module 90.

The clamping block 31 is slidably mounted on the support seat 32 via the support member 34, and the buffer 36 is disposed between the support seat 32 and the clamping block 31.

In this way, when the clamping block 31 abuts against the battery module 90, the buffer 36 can provide elastic buffering to prevent hard contact between the clamping block 31 and the battery module 90 to some extent, reducing the damage to the battery module 90, thereby well protecting the battery module 90.

In some embodiments, the buffer 36 includes at least one of a spring, an elastic piece, and an elastic gasket.

The spring refers to a mechanical part operating by using elasticity, and is a part made of an elastic material that deforms under an external force and returns to its original shape after the external force is removed. The spring is typically made of spring steel.

The elastic piece is a component of a buffering and shock absorbing apparatus used in a machine and a vehicle.

The elastic gasket refers to a gasket structure capable of generating elastic deformation when subjected to an extrusion force and returning to its original shape after the extrusion force is removed.

The buffer 36 uses at least one of the spring, the elastic piece, and the elastic gasket, featuring simple structure, low costs, and easy assembly.

In some embodiments, the support member 34 includes a guide rod 341, the support seat 32 is provided with a sliding hole 321, the guide rod 341 slidably runs through the sliding hole 321, and the clamping block 31 is supported on the guide rod 341.

The guide rod 341 refers to an elongated rod-like structure. The sliding hole 321 refers to a through hole structure provided on the support seat 32. The guide rod 341 runs through the sliding hole 321, so that the guide rod 341 is slidably mounted on the support seat 32, and thus the guide rod 341 is capable of sliding on the support seat 32. The clamping block 31 being supported on the guide rod 341 refers to that the clamping block 31 is supported by the guide rod 341.

The support seat 32 is provided with the sliding hole 321, the guide rod 341 is used for supporting the clamping block 31, and the guide rod 341 is slidably inserted into the sliding hole 321, so that the clamping block 31 is slidably mounted on the support seat 32 along the first direction X, featuring simple structure and easy assembly.

In some embodiments, the support member 34 may also include another guide structure, for example, the support member 34 may include a guide rail, where the guide rail is slidably mounted on the support seat 32, and the clamping block 31 is connected to the guide rail, so that the clamping block 31 is slidably mounted on the support seat 32.

In some embodiments, the sliding member 30 further includes a limiting member 35, where the limiting member 35 is configured to stop the support seat 32 so as to prevent the guide rod 341 from falling off, and the limiting member 35 is mounted at an end of the guide rod 341 away from the clamping block 31.

The limiting member 35 refers to a structural member configured to stop the support seat 32, and the limiting member 35 may be a plate structure member, a block structure, or the like.

The limiting member 35 is connected to the end of the guide rod 341 away from the clamping block 31. When the clamping block 31 leaves the battery module 90, the clamping block 31 is pushed by the buffer 36 to move away from the support seat 32. In this way, the guide rod 341 is driven to move on the support seat 32 until the limiting member 35 stops the support seat 32, thus preventing the guide rod 341 from falling off from the support seat 32 to some extent.

The provision of the limiting member 35 can reduce the risk of the guide rod 341 falling off when the guide rod 341 slides in the sliding hole 321, facilitating the use of the module tray 100.

In some embodiments, a guide sleeve 342 is slidably mounted on the guide rod 341, the guide sleeve 342 being mounted in the sliding hole 321.

The guide sleeve 342 refers to a sleeve structure adapted to the guide rod 341. The guide sleeve 342 is mounted in the sliding hole 321, so that the guide sleeve 342 is supported by the support seat 32.

The guide sleeve 342 is provided in the sliding hole 321 to stably support the guide rod 341 and guide the guide rod 341 to move stably, thereby driving the clamping block 31 to move stably.

In some embodiments, in a case that the sliding member 30 includes the connection seat 33 and the support member 34, the clamping block 31 is detachably connected to the connection seat 33, the connection seat 33 is connected to the support member 34, the support member 34 is slidably mounted on the support seat 32, and the buffer 36 is disposed between the connection seat 33 and the support seat 32.

In some embodiments, the sliding member 30 further includes a first gasket 37, where the first gasket 37 is disposed between the connection seat 33 and the clamping block 31, is capable of protecting the clamping block 31, and is also capable of playing a certain locking role when the connection seat 33 is fixedly connected to the clamping block 31.

In some embodiments, the sliding member 30 may alternatively be an integrated structural member to directly abut against the battery module 90.

In some embodiments, the sliding member 30 is provided with a first avoidance groove 311 on a surface facing the reference member 20, and the reference member 20 is provided with a second avoidance groove 211 corresponding to the first avoidance groove 311 on a surface facing the sliding member 30.

An avoidance groove refers to a groove structure provided on a structural member.

The first avoidance groove 311 refers to a groove structure provided on the sliding member 30, and the first avoidance groove 311 is provided on the surface of the sliding member 30 facing the reference member 20.

The second avoidance groove 211 refers to a groove structure provided on the reference member 20, and the second avoidance groove 211 is provided on the surface of the reference member 20 facing the sliding member 30.

A position of the first avoidance groove 311 corresponds to a position of the second avoidance groove 211, that is, a distance from the first avoidance groove 311 to the tray body

10 is equal to or approximate to a distance from the second avoidance groove 211 to the tray body 10.

With the first avoidance groove 311 provided on the sliding member 30 and the second avoidance groove 211 provided on the reference member 20, a binding member 92 such as a binding strap can be used to run through the first avoidance groove 311 and the second avoidance groove 211 to bind and restrain the battery module 90 when the sliding member 30 and the reference member 20 cooperatively clamp the battery module 90.

In some embodiments, in a case that the sliding member 30 includes the clamping block 31, the first avoidance groove 311 is provided on the clamping block 31.

In some embodiments, the module tray 100 further includes an elongated seat 11, the elongated seat 11 being configured to support the battery module 90, the elongated seat 11 being mounted on the tray body 10, and the elongated seat 11 extending along the first direction X.

The elongated seat 11 refers to an elongated seat structure, for example, a structure such as an elongated plate, beam, rod, and column can be used.

The elongated seat 11 is disposed on the tray body 10 to support the battery module 90, helping the sliding member 30 and the reference member 20 to cooperatively clamp the battery module 90. In addition, the provision of the elongated seat 11 can also position the bottom of the battery module 90, facilitating subsequent processing.

In some embodiments, a height of the sliding member 30 protruding from the elongated seat 11 is less than a height of the battery module 90, and a height of the reference member 20 protruding from the elongated seat 11 is less than the height of the battery module 90.

A height direction Z refers to a direction perpendicular to the tray body 10. The height of the sliding member 30 protruding from the elongated seat 11 refers to a height of the sliding member 30 protruding from the elongated seat 11 along the height direction Z. The height of the reference member 20 protruding from the elongated seat 11 refers to a height of the reference member 20 protruding from the elongated seat 11 along the height direction Z. The height of the battery module 90 refers to a height of the battery module 90 in the height direction Z under the condition that the battery module 90 is placed on the elongated seat 11.

Setting the heights of the sliding member 30 and the reference member 20 protruding from elongated seat 11 to be less than the height of the battery module 90 can facilitate mounting of a steel strip 93 at the top of the battery module 90.

Figure 9:
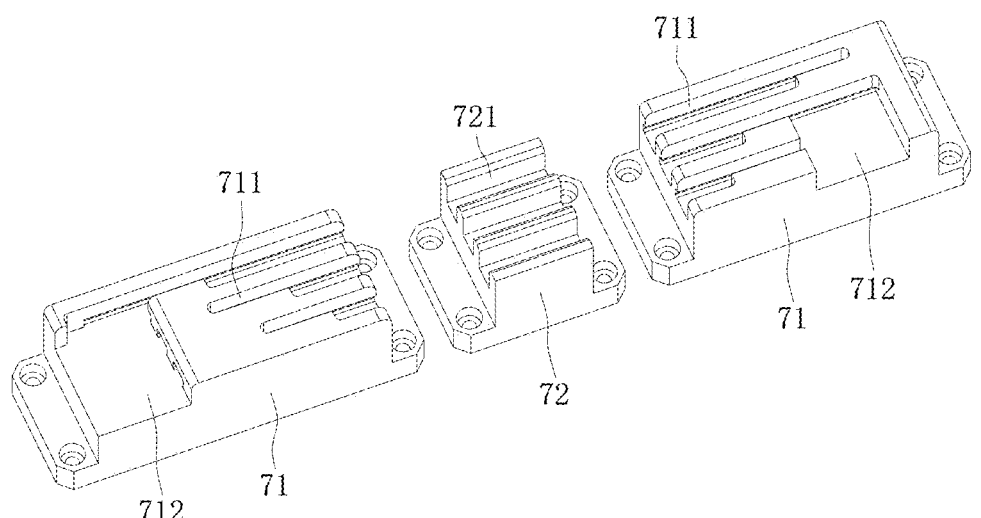
FIG. 9 is a schematic structural diagram of a support fixture in FIG. 1.

Referring to FIG. 1, FIG. 9, and FIG. 10, in some embodiments, two opposite sides of the tray body 10 are each provided with a support fixture 70, the support fixture 70 being configured to support a side plate.

The support fixture 70 refers to a fixture configured to support a side plate of the battery module 90.

The two opposite sides of the tray body 10 are each provided with the support fixture 70. In this way, two side plates can be supported on the tray body 10, so that the side plates are respectively mounted on the two opposite sides of the battery module 90.

The support fixture 70 is disposed on the tray body 10 to support the side plate, facilitating mounting of the side plate to the battery module 90 in a subsequent procedure, thereby improving the battery assembly efficiency.

In some embodiments, in a case that the side plate 94 of the battery module 90 is provided with a cooling apparatus such as a water pipe, the side plate 94 can be formed as a cooling plate.

In some embodiments, the support fixture 70 includes two support blocks 71, where each of the support blocks 71 is provided with an accommodating groove 711 for accommodating a corresponding end of the side plate 94, and the two support blocks 71 are configured to cooperatively support two opposite ends of the side plate 94.

The support block 71 refers to a block structure configured to support the side plate 94. The accommodating groove 711 refers to a groove structure provided on the support block 71. The accommodating groove 711 is provided on the support block 71 to accommodate the side plate 94, so that the side plate 94 is clamped by the support block 71.

The two support blocks 71 are provided to support the two opposite ends of the side plate 94 so as to stably support the side plate 94.

The support block 71 is provided with the accommodating groove 711, and the support fixture 70 is provided with the two support blocks 71 to support the two opposite ends of the side plate 94, thereby stably supporting the side plate 94 and facilitating subsequent use of the side plate 94.

In some embodiments, the accommodating groove 711 is provided in plurality on each of the support blocks 71 to adapt to side plates 94 of various models, and the plurality of accommodating grooves 711 provided on at least one of the support blocks 71 are different in length.

The accommodating grooves 711 are different in length. In this way, when positions of the two support blocks 71 are fixed, side plates 94 that can be adaptively supported by different accommodating grooves 711 are also different in length.

The plurality of accommodating grooves 711 with different lengths are provided on the support block 71 to adapt to side plates 94 of various length models, so that corresponding side plates 94 can be inserted into the support fixtures 70 according to battery modules 90 of different models, facilitating subsequent assembly and improving the battery manufacturing efficiency.

In some embodiments, at least one of the support blocks 71 is provided with an open groove 712 for accommodating a bent edge of an end of the side plate 94, the open groove 712 being in communication with the accommodating groove 711.

The open groove 712 refers to a groove structure provided on the support block 71. The open groove 712 is in communication with the accommodating groove 711. In a case that an end of the side plate 94 is provided with a bent edge, the bent edge can extend into the open groove 712 when two ends of the side plate 94 are inserted into the accommodating grooves 711 of the support block 71, so that the side plate 94 can be supported. For some battery modules 90, an end of the side plate 94 is bent toward one side to form a bent edge. The provision of the bent edge can facilitate connection with an end plate of the battery module 90.

The open groove 712 is provided on the support block 71 to accommodate the bent edge of the end of the side plate 94, helping to position and support the side plate 94.

In some embodiments, the support fixture 70 further includes at least one middle block 72, where the middle block 72 is configured to cooperatively support a middle region of the side plate 94, and the middle block 72 is provided with a positioning groove 721 for insertion of the side plate 94.

The middle block 72 refers to a block structure configured to support the side plate 94. The positioning groove 721 refers to a groove structure provided on the middle block 72. The positioning groove 721 is provided on the middle block 72 to accommodate the side plate 94, so that the side plate 94 is clamped by the middle block 72.

The middle block 72 is provided to support the middle region of the side plate 94 and support the side plate 94 more stably in cooperation with the two support blocks 71.

In some embodiments, the support fixtures 70 on two opposite sides of the tray body 10 are in rotational symmetry with respect to a central axis, the central axis being perpendicular to the tray body 10 and running through a geometric center of the tray body 10.

The support fixtures 70 on the two opposite sides of the tray body 10 being in rotational symmetry with respect to the central axis refers to that the support fixtures 70 on the two opposite sides of the tray body 10 are same in structure, and the support fixtures 70 on the two opposite sides of the tray body 10 are disposed in a manner of rotating 180 degrees with respect to the central axis.

The geometric center of the tray body 10 refers to an intersection point of a central plane of the tray body 10 in a width direction Y, a central plane in a thickness direction Z, and a central plane in a length direction X. The central axis refers to an axis running through this point and perpendicular to the tray body 10.

The side plates 94 on two sides of the battery module 90 are disposed opposite each other. In this way, the support fixtures 70 on two sides of the tray body 10 are in rotational symmetry, so that two side plates 94 can be supported opposite each other on the tray body 10, facilitating assembly and improving efficiency.

Referring to FIG. 1 to FIG. 5 and FIG. 10, in some embodiments, the adjustment mechanism 40 includes a screw rod 41 disposed along the first direction X, a nut 42 mounted on the screw rod 41, and support bases 43 rotatably supporting two opposite ends of the screw rod 41, where the sliding member 30 is connected to the nut 42, and the support base 43 is mounted on the tray body 10.

The screw rod 41 refers to a rod-like structural member provided with external threads. The nut 42 refers to a structural member provided with internal threads. The nut 42 is mounted on the screw rod 41. The screw rod 41 is rotated to drive the nut 42 to move along an axial direction of the screw rod 41.

The support base 43 refers to a support structure configured to support the screw rod 41, and the screw rod 41 is capable of rotating on the support base 43. The support base 43 is mounted on the tray body 10, and the support base 43 is supported by the tray body 10, so that the screw rod 41 is rotatably mounted on the tray body 10.

The sliding member 30 is connected to the nut 42, so that the nut 42 is capable of moving on the tray body 10 along the first direction X.

With the screw rod 41 and the nut 42 provided, the position of the sliding member 30 can be accurately adjusted, helping the sliding member 30 to clamp or release the battery module 90 in cooperation with the reference member 20. In addition, when the sliding member 30 clamps the battery module 90 in cooperation with the reference member 20, the sliding member 30 is subjected to the counteraction from the battery module 90 so as to drive the nut 42 to abut against the screw rod 41, such that the nut 42 is locked on the screw rod 41, thereby positioning the sliding member 30 and helping the sliding member 30 to stably clamp the battery module 90 in cooperation with the reference member 20.

In some embodiments, the adjustment mechanism 40 may alternatively be another mechanism. For example, the adjustment mechanism 40 may include a structure formed by a lock sleeve and a push rod, where the lock sleeve fits around the push rod. The push rod is configured to push the sliding member 30 to adjust the position of the sliding member 30. In addition, the lock sleeve may be provided with a screw, where the screw is configured to abut against the push rod so as to lock a relative position between the lock sleeve and the push rod.

In some embodiments, an end of the screw rod 41 is provided with a plug 411, the plug 411 being configured to connect an external rotatable driving tool.

The plug 411 refers to a connector structure that can be plugged into an external rotatable driving tool.

The external rotatable driving tool may be a rotatable tool such as a motor and a rotary cylinder.

The plug 411 may be a structure such as a rectangular column, a hexagonal column (hexagonal column), and an inner hexagonal hole. However, it is necessary to provide a socket adapted to the plug 411 in the external rotatable driving tool, for example, the plug 411 is a hexagonal column, so the socket is an inner hexagonal hole structure.

The plug 411 is disposed at an end of the screw rod 41 to connect the external driving tool, so that the screw rod 41 can be driven by the external driving tool to rotate so as to adjust positions of the nut 42 and the sliding member 30.

In some embodiments, the adjustment mechanism 40 further includes a guide assembly 44, the guide assembly 44 being mounted on the tray body 10, and the guide assembly 44 being configured to support and guide the sliding member 30 to move along the first direction X.

The guide assembly 44 refers to an assembly configured to support the sliding member 30 and guide the sliding member 30 to move along the first direction X.

The guide assembly 44 being provided can not only stably support the sliding member 30 but also flexibly and stably guide the sliding member 30 to move along the first direction X.

In some embodiments, the guide assembly 44 includes a guide rail 441 mounted on the tray body 10 and a sliding block 442 slidably mounted on the guide rail 441, the sliding block 442 being connected to the sliding member 30.

A guide rail refers to a groove or ridge made of metal or other materials, which is an apparatus capable of bearing, fixing, and guiding a moving apparatus or device and reducing its friction. A guide rail, also referred to as a sliding rail, a linear guide rail, or a linear sliding rail, is used in linear reciprocating motion occasions, has a higher rated load than a linear bearing, and is capable of bearing a certain torque and implementing high-precision linear motion under high load conditions.

A sliding block refers to a block structure that fits with a guide rail and is slidably mounted on the guide rail.

The guide rail 441 is a guide rail structure. The sliding block 442 is a sliding block structure. The sliding block 442 is slidably mounted on the guide rail 441, and the sliding block 442 is capable of moving along the guide rail 441.

The sliding member 30 is supported by the sliding block 442 and the sliding block 442 is guided by the guide rail 441 to move, so as to stably support the sliding member 30 and guide the sliding member 30 to move flexibly, featuring simple structure and low costs.

In some embodiments, the guide assembly 44 may be another structure. For example, the guide assembly 44 may include a guide rod and a guide sleeve slidably fitting around the guide rod, where the guide sleeve is connected to the sliding member 30, and the guide rod is supported on the tray body 10.

A guide rod refers to an elongated rod-like structure. A guide sleeve refers to a sleeve structure adapted to a guide rod. The guide sleeve fits around the guide rod and is capable of sliding along the guide rod.

The sliding member 30 is supported by the guide sleeve and the guide sleeve is guided by the guide rod to move, so as to stably support the sliding member 30 and guide the sliding member 30 to move flexibly, featuring simple structure and low costs.

In some embodiments, the reference member 20 includes a base 22 and a reference block 21, the base 22 being fixed to the tray body 10, and the reference block 21 being detachably mounted on the base 22.

The reference block 21 refers to a structural member configured to abut against the battery module 90 for positioning the battery module 90, and to clamp the battery module 90 in cooperation with the sliding member 30.

The base 22 refers to a structural member configured to support the reference block 21. The base 22 is mounted on the tray body 10, and the base 22 is supported by the tray body 10 so as to support the reference block 21.

The base 22 is provided to support the reference block 21. The reference block 21 is provided, and the reference block 21 is detachably mounted on the base 22, so as to cooperatively abut against the battery module 90. In addition, corresponding reference blocks 21 are replaced according to the models of the battery module 90, reducing the damage to the battery module 90. It is also convenient for the reference block 21 to clamp the battery module 90 in cooperation with the sliding member 30.

In some embodiments, the reference member 20 may be an integrated structural member. In other words, the reference block 21 and the base 22 are an integrally formed structure. Integral formation refers to a structural member being manufactured and formed as a single piece.

In some embodiments, in a case that the reference member 20 includes the reference block 21, the second avoidance groove 211 is provided on the reference block 21.

In some embodiments, the reference member 20 further includes a second gasket, where the second gasket is disposed between the base 22 and the reference block 21, is capable of protecting the reference block 21, and is also capable of playing a certain locking role when the base 22 is fixedly connected to the reference block 21.

Referring to FIG. 1, FIG. 6 to FIG. 8, and FIG. 10 to FIG. 12, in some embodiments, the module tray 100 further includes a clamping mechanism 60 and two clamping plates 50, where the clamping mechanism 60 is configured to support and drive the two clamping plates 50 to cooperatively clamp and fix the battery module 90, and the clamping mechanism 60 is mounted on the tray body 10.

The clamping plate 50 refers to a plate structure configured to clamp two opposite sides of the battery module 90. The two opposite sides of the battery module 90 refer to two opposite sides of the battery module 90 in a length direction, and the two opposite sides of the battery module 90 in the length direction define the width of the battery module 90.

The clamping mechanism 60 refers to a mechanism configured to support the clamping plates 50 and drive the two clamping plates 50 to approach each other so as to clamp the two opposite sides of the battery module 90.

The clamping mechanism 60 is mounted on the tray body 10, so that the clamping mechanism 60 is supported by the tray body 10 so as to support the clamping plates 50.

The clamping mechanism 60 is provided to push the two clamping plates 50 to cooperatively clamp and fix the two opposite sides of the battery module 90, so that the shake of the battery module 90 can be alleviated during movement, facilitating the subsequent processing and manufacture. In addition, the two clamping plates 50, the reference member 20, and the sliding member 30 can also cooperatively clamp four sides of the battery module 90 so as to stably support the battery module 90, better alleviating the shake of the battery module 90.

In some embodiments, the clamping mechanism 60 includes: a plurality of support members 61 configured to support the two clamping plates 50, the support member 61 being slidably mounted on the tray body 10 along a second direction Y; and at least two pushing structures 62 configured to respectively push the two clamping plates 50 to move along the second direction Y, the pushing structure 62 being mounted on the tray body 10, where the second direction Y intersects with the first direction X.

The support member 61 refers to a structural member configured to support the clamping plate 50, which may be a plate member, a block member, a frame member, or the like.

The support member 61 being slidably mounted on the tray body 10 along the second direction Y refers to that the support member 61 is capable of moving on the tray body 10 along the second direction Y.

The pushing structure 62 refers to a mechanism configured to push the clamping plate 50 to move along the second direction Y. The pushing structure 62 is mounted on the tray body 10, so that the pushing structure 62 is supported by the tray body 10. At least two pushing structures 62 are provided to respectively push the two clamping plates 50 to move.

The second direction Y intersecting with the first direction X refers to that a specified included angle may be formed between the second direction Y and the first direction X or the second direction Y may be perpendicular to the first direction X. In this way, the battery module 90 is supported on the tray body 10 along the first direction X. When the clamping plates 50 are pushed to move along the second direction Y, the two clamping plates 50 can approach or leave each other.

The pushing structures 62 are provided to respectively support the two clamping plates 50 to move along the second direction Y, so that the two clamping plates 50 cooperatively clamp the two opposite sides of the battery module 90 to stabilize the battery module 90. In addition, the support member 61 is provided to stably support the clamping plate 50 and guide the clamping plate 50 to stably move, allowing the clamping plate 50 to stably clamp the battery module 90, thereby reducing the shake of the battery module 90 during movement.

In some embodiments, the second direction Y may be consistent with the width direction of the tray body 10. In addition, the first direction X is consistent with the length direction of the tray body 10.

In some embodiments, the clamping mechanism 60 may be another mechanism. For example, the clamping mechanism 60 may include an elastic telescopic rod, where the elastic telescopic rod is capable of supporting one clamping plate 50 and pushing the clamping plate 50 in a direction facing the other clamping plate 50.

In some embodiments, the pushing structure 62 includes: a dragging structure 622 configured to drag the clamping plate 50 to move along the second direction Y; and a pushing plate 621 slidably mounted on the tray body 10 along the first direction X and configured to drive the dragging structure 622 to drag the clamping plate 50 to move.

The dragging structure 622 is configured to drag the clamping plates 50, allowing the clamping plates 50 to move along the second direction Y, thereby allowing the two clamping plates 50 to cooperatively clamp the battery module 90.

The pushing plate 621 refers to a plate structure configured to drive the dragging structure 622. The pushing plate 621 is slidably mounted on the tray body 10 along the first direction X, that is, the pushing plate 621 can be supported by the tray body 10. In addition, the pushing plate 621 is capable of moving along the first direction X; and when the pushing plate 621 moves along the first direction X, the dragging structure 622 is driven to drag the clamping plate 50 to move.

The dragging structure 622 is provided to drag the clamping plate 50 to move along the second direction Y so as to control the position of the clamping plate 50. In addition, the pushing plate 621 is provided to drive the dragging structure 622, helping to control actions of the dragging structure 622 to control the position of the clamping plate 50, thereby allowing the clamping plate 50 to clamp the battery module 90 or release the battery module 90.

Referring to FIG. 1 and FIG. 6 to FIG. 8, in some embodiments, the dragging structure 622 includes a slide way 6221 and a roller 6222 slidably disposed in the slide way 6221. The clamping plate 50 is connected with a pushing member 67. One of the pushing member 67 and the pushing plate 621 is provided with the roller 6222, and the other of the pushing member 67 and the pushing plate 621 is provided with the slide way 6221.

The slide way 6221 refers to an elongated groove or hole structure provided on a medium. The roller 6222 refers to a wheel structure capable of rolling. When the roller 6222 is placed in the slide way 6221, the slide way 6221 can guide the roller 6222 to move.

The pushing member 67 refers to a plate member or a block member that is connected to the clamping plate 50 and configured to push the clamping plate 50 to move.

It is possible that the pushing member 67 is connected with the roller 6222 and the slide way 6221 is correspondingly provided on the pushing plate 621, or that the oil way is provided on the pushing member 67 and the pushing plate 621 is connected with the roller 6222. In this way, when the pushing plate 621 moves along the first direction X, the roller 6222 can be pushed to move relative to the slide way 6221.

The roller 6222 is guided by the slide way 6221 to move so as to drive the clamping plate 50 to move along the second direction Y, featuring simple structure, easy processing and manufacture, and easy control.

In some embodiments, each support member 61 is provided with the pushing member 67. The dragging structure 622 is in one-to-one correspondence with the pushing member 67.

Each support member 61 is provided with the pushing member 67, facilitating mounting and fixation of the pushing member 67, thereby allowing the pushing member 67 to be connected to the clamping plate 50.

Each support member 61 is provided with the pushing member 67, and the dragging structure 622 is in one-to-one correspondence with the pushing member 67. In this way, each support member 61 can be pushed by the dragging structure 622 to move along the second direction Y, so as to push the clamping plate 50 to move stably and flexibly.

Figure 11:
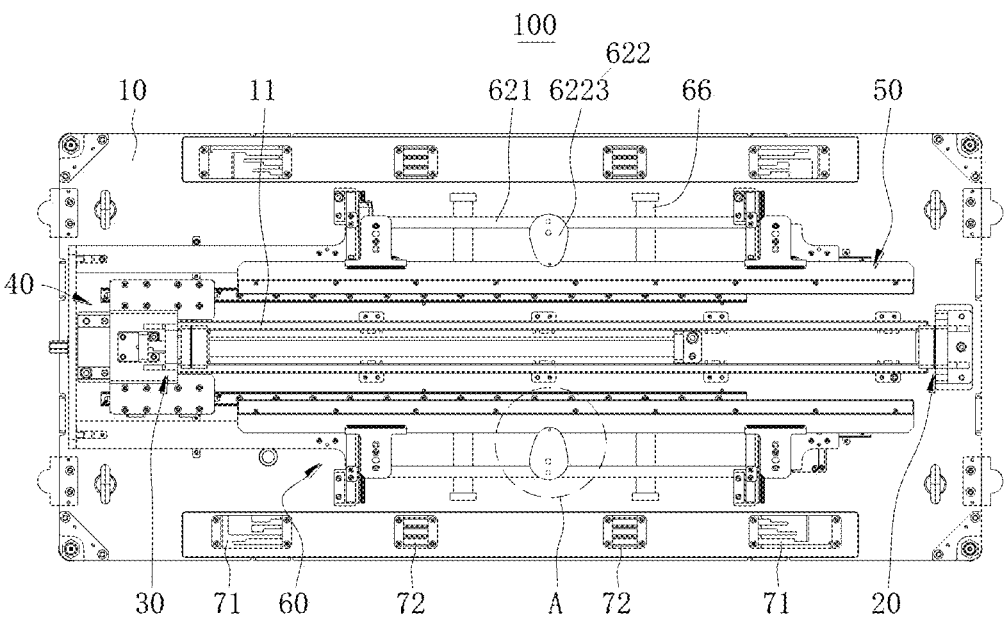
FIG. 11 is a schematic structural top view of a module tray according to some other embodiments of this application.
Figure 12:
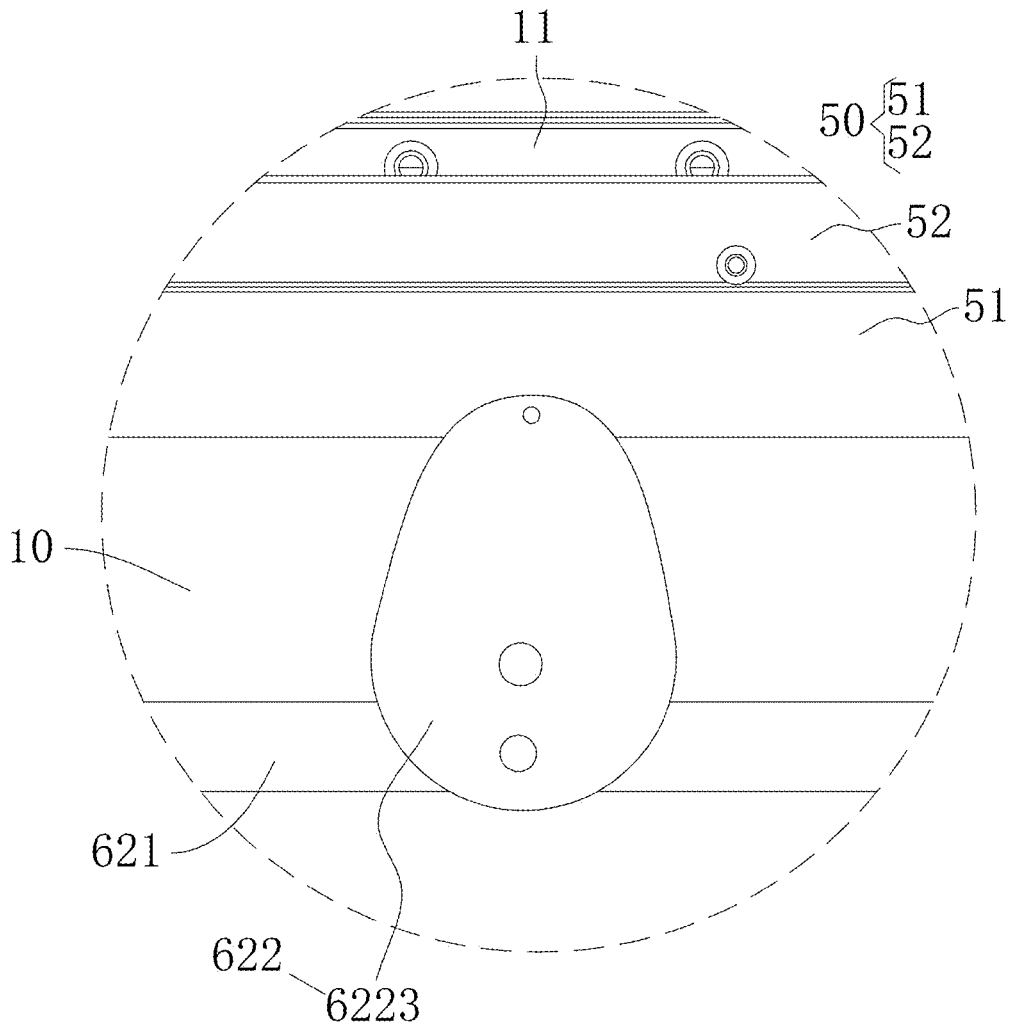
FIG. 12 is an enlarged view of part A in FIG. 11.

Referring to FIG. 10 to FIG. 12, in some embodiments, the dragging structure 622 includes an eccentric member 6223, where a middle portion of the eccentric member 6223 is rotatably mounted on the tray body 10, one side of the eccentric member 6223 is rotatably connected to the pushing plate 621, and the other side of the eccentric member 6223 is used for dragging the clamping plate 50 to move along the second direction Y.

The eccentric member 6223 refers to a structural member provided with one side or one end protruding to deviate from its rotation center. The middle portion of the eccentric member 6223 is rotatably mounted on the tray body 10, and one side of the eccentric member 6223 is rotatably connected to the pushing plate 621, so that when the eccentric member 6223 is driven by the pushing plate 621 to rotate, the other side of the eccentric member 6223 is able to drag the clamping plate 50 to move along the second direction Y.

The pushing plate 621 is used to drive the eccentric member 6223 to rotate, and the eccentric member 6223 is configured to push the clamping plate 50 to move along the second direction Y, featuring simple structure and easy operation and control.

In some embodiments, the eccentric member 6223 includes a cam or a crank.

A cam refers to a mechanical rotating or sliding structure (for example, a wheel or a protruding portion of a wheel), which transfers motion to a wheel axle moving close to its edge or to a needle bar moving freely on a grooved surface, or bears force from such wheel axle and needle bar.

A crank refers to an elongated plate structure.

The cam or the crank is used, featuring simple structure and low costs.

In some embodiments, the dragging structures 622 of the at least two pushing structures 62 are configured to push the two clamping plates 50 to move reversely along the second direction Y. The pushing structure 62 further includes a connection plate 623 connecting the pushing plates 621 corresponding to the two clamping plates 50.

The connection plate 623 refers to a plate structure connecting the pushing plates 621 corresponding to the two clamping plates 50. In a case that two pushing structures 62 are provided, two corresponding pushing plates 621 are provided, and the connection plate 623 connects the two pushing plates 621. In a case that more than two pushing structures 62 are provided, the clamping plate 50 corresponds at least to multiple pushing structures 62, and these pushing structures 62 jointly act to stably push the clamping plate 50 to move. In this case, the multiple pushing structures 62 can push the clamping plate 50 more flexibly and stably, and the pushing structures 62 may be made in a small size to facilitate processing, manufacture, and assembly, so that the clamping plate 50 corresponds to multiple pushing plates 621. In addition, in a case that the clamping plate 50 corresponds to multiple pushing plates 621, these pushing plates 621 are connected through the connection plate 623, and the pushing plates 621 corresponding to the two clamping plates 50 are also connected through the connection plate 623. In this way, the connection plate 623 allows the pushing plates 621 corresponding to the two clamping plates 50 to move synchronously. The dragging structures 622 of the at least two pushing structures 62 being configured to push the two clamping plates 50 to move reversely along the second direction Y refers that when the pushing plates 621 corresponding to the two clamping plates 50 push the dragging structures 622 on the two opposite sides of the tray body 10 to operate, the two clamping plates 50 move reversely, so that the two clamping plates 50 clamp the two opposite sides of the battery module 90 or release the battery module 90.

The pushing plates 621 corresponding to the two clamping plates 50 refer to that among multiple pushing plates 621 of the module tray 100, if movement of one pushing plate

621 can drive one clamping plate 50 to move, this pushing plate 621 corresponds to this clamping plate 50.

The provision of the connection plate 623 helps to push the pushing plates 621 corresponding to the clamping plates 50 to move synchronously, thus synchronously driving the dragging structures 622 connected to the pushing plates 621. In addition, the dragging structures 622 of the at least two pushing structures 62 push the two clamping plates 50 to move reversely along the second direction Y, so that when the pushing plates 621 corresponding to the two clamping plates 50 move synchronously, the two clamping plates 50 can be driven to move reversely along the second direction Y, allowing the two clamping plates 50 to approach each other so as to clamp the two opposite sides of the battery module 90, or allowing the two clamping plates 50 to leave each other so as to release the battery module 90.

In some embodiments, the clamping mechanism 60 further includes a first guide assembly 63 guiding a corresponding pushing plate 621 to move along the first direction X, where the first guide assembly 63 is mounted on the tray body 10.

A guide assembly refers to an assembly of a component moving along a direction.

The first guide assembly 63 refers to an assembly configured to guide the corresponding pushing plate 621 to move along the first direction X.

The first guide assembly 63 is provided to stably guide the pushing plate 621 to move along the first direction X, facilitating slidable mounting of the pushing plate 621 on the tray body 10.

In some embodiments, the first guide assembly 63 includes a first guide rail 631 extending along the first direction X and a first sliding block 632 slidably mounted on the first guide rail 631, where the pushing plate 621 is connected to the first sliding block 632.

A guide rail refers to a groove or ridge made of metal or other materials, which is an apparatus capable of bearing, fixing, and guiding a moving apparatus or device and reducing its friction. A guide rail, also referred to as a sliding rail, a linear guide rail, or a linear sliding rail, is used in linear reciprocating motion occasions, has a higher rated load than a linear bearing, and is capable of bearing a certain torque and implementing high-precision linear motion under high load conditions.

A sliding block refers to a block structure that fits with a guide rail and is slidably mounted on the guide rail.

The first guide rail 631 refers to a guide rail disposed on the tray body 10 in a manner of extending along the first direction X.

The first sliding block 632 refers to a sliding block that fits with the first guide rail 631 and is slidably mounted on the first guide rail 631.

The first guide rail 631 and the first sliding block 632 are provided to support and guide the pushing plate 621 to move along the first direction X, featuring simple structure and easy assembly.

In some embodiments, the clamping mechanism 60 further includes a second guide assembly 64 guiding a corresponding support member 61 to move along the second direction X, where the second guide assembly 64 is mounted on the tray body 10.

A guide assembly refers to an assembly of a component moving along a direction.

The second guide assembly 64 refers to an assembly configured to guide the corresponding support member 61 to move along the second direction Y.

The second guide assembly 64 is provided to stably guide the support member 61 to move along the second direction Y, facilitating slidable mounting of the support member 61 on the tray body 10.

In some embodiments, the second guide assembly 64 includes a second guide rail 641 extending along the second direction Y and a second sliding block 642 slidably mounted on the second guide rail 641, where the support member 61 is connected to the second sliding block 642.

A guide rail refers to a groove or ridge made of metal or other materials, which is an apparatus capable of bearing, fixing, and guiding a moving apparatus or device and reducing its friction. A guide rail, also referred to as a sliding rail, a linear guide rail, or a linear sliding rail, is used in linear reciprocating motion occasions, has a higher rated load than a linear bearing, and is capable of bearing a certain torque and implementing high-precision linear motion under high load conditions.

A sliding block refers to a block structure that fits with a guide rail and is slidably mounted on the guide rail.

The second guide rail 641 refers to a guide rail that extends along the second direction X and is supported on the tray body 10.

The second sliding block 642 refers to a sliding block that fits with the second guide rail 641 and is slidably mounted on the second guide rail 641.

The second guide rail 641 and the second sliding block 642 are provided to support and guide the support member 61 to move along the second direction Y, featuring simple structure and easy assembly.

In some embodiments, the second sliding block 642 and the support member 61 may be an integrally formed structure, facilitating assembly and reducing components. Integral formation refers to integral manufacture and formation of a structural member.

In some embodiments, the pushing structure 62 further includes an elastic pushing member 624, where the elastic pushing member 624 is configured to elastically drive the pushing plate 621 to move along the first direction X, allowing the dragging structure 622 to drag one clamping plate 50 to move toward the other clamping plate 50.

The elastic pushing member 624 refers to a structural member that generates elastic deformation when subjected to an external force and restores after the external force is removed.

The elastic pushing member 624 is provided to drive the pushing plate 621 to move, so that the dragging structure 622 can automatically push one clamping plate 50 to move toward the other clamping plate 50, allowing the two clamping plates 50 to approach each other to clamp the two opposite sides of the battery module 90, thereby automatically clamping the two opposite sides of the battery module 90.

In some embodiments, one end of the elastic pushing member 624 is connected to the tray body 10, and the other end of the elastic pushing member 624 is connected to the pushing plate 621 so as to drive the pushing plate 621 to move along the first direction X, allowing the dragging structure 622 to drag one clamping plate 50 to move toward the other clamping plate 50.

In some embodiments, the elastic pushing member 624 may be a spring, an elastic piece, an elastic telescopic member, or the like.

In some embodiments, the clamping mechanism 60 further includes an elastic member 66, the elastic member 66 being configured to elastically push one clamping plate 50 to move toward the other clamping plate 50.

The elastic member 66 refers to a structural member that generates elastic deformation when subjected to an external force and restores after the external force is removed.

The elastic member 66 is provided to drive one clamping plate 50 to move toward the other clamping plate 50, thus allowing the two clamping plates 50 to approach each other to clamp the two opposite sides of the battery module 90.

In some embodiments, one end of the elastic member 66 abuts against one clamping plate 50, and the other end of the elastic member 66 is mounted on the tray body 10, so that the elastic member 66 can push the clamping plate 50 toward the other clamping plate 50.

In some embodiments, a buffering member 65 configured to provide elastic buffering is disposed between the support member 61 and the clamping plate 50.

The buffering member 65 refers to a structure capable of providing an elastic counteraction force and generating elastic deformation when subjected to an extrusion force. For example, the buffering member 65 may be an elastic piece, a rubber gasket.

The buffering member 65 is disposed between the support member 61 and the clamping plate 50 and is capable of providing elastic buffering when the battery module 90 is clamped by the clamping plate 50, reducing the damage to the battery module 90.

In some embodiments, the clamping plate 50 includes a mounting seat 51 and a gripping plate 52 detachably mounted on the mounting seat 51, where the mounting seat 51 is mounted on the clamping mechanism 60.

The gripping plate 52 refers to a plate member configured to abut against sides of the battery module 90 and clamp the battery module 90.

The mounting seat 51 refers to a structural member configured to support the gripping plate 52. The mounting seat 51 is mounted on the clamping mechanism 60. The mounting seat 51 is supported by the clamping mechanism 60, thereby supporting the gripping plate 52 and driving the gripping plate 52 to move along the second direction Y.

The mounting seat 51 is provided to support the gripping plate 52. In addition, the gripping plate 52 is detachably mounted on the mounting seat 51, so that corresponding gripping plates 52 can be replaced according to battery modules 90 of different models, more stably clamping and fixing the battery module 90 and better alleviating the shake of the battery module 90.

In some embodiments, the clamping plate 50 may be an integrated structural member. In other words, the mounting seat 51 and the gripping plate 52 are an integrally formed structure. Integral formation refers to integral manufacture and formation of a structural member.

According to some embodiments of this application, this application provides a module tray 100 including: a tray body 10, a reference member 20, a sliding member 30, and an adjustment mechanism 40. The reference member 20 is mounted on the tray body 10 and configured for supporting and positioning a battery module 90 in a first direction X. The sliding member 30 is slidably mounted on the tray body 10 along the first direction X and configured to clamp the battery module 90 in cooperation with the reference member 20. The adjustment mechanism 40 is connected to the sliding member 30, the adjustment mechanism 40 is configured to drive the sliding member 30 to move along the first direction X and lock a position of the sliding member 30, and the adjustment mechanism 40 is mounted on the tray body 10. The sliding member 30 includes a support seat 32, a connection seat 33, a clamping block 31, a support member 34 slidably supporting the clamping block 31 along the first direction X, and a buffer 36. The support member 34 is slidably mounted on the support seat 32. The clamping block 31 is detachably connected to the connection seat 33. The connection seat 33 is connected to the support member 34. The support member 34 is slidably mounted on the support seat 32. The buffer 36 is disposed between the connection seat 33 and the support seat 32. The support seat 32 is connected to the adjustment mechanism 40, and the support seat 32 is slidably mounted on the tray body 10 along the first direction X. The module tray 100 can be adapted to battery modules 90 with different lengths. In addition, corresponding clamping blocks 31 can be replaced according to battery modules 90 of different models, and the battery modules 90 can be securely protected when the battery modules 90 are clamped.

According to some embodiments of this application, this application further provides a battery production device including the module tray described in any one of the foregoing solutions.

In conclusion, it should be noted that the foregoing embodiments are for description of the technical solutions of this application only rather than for limiting this application. Although this application has been described in detail with reference to the foregoing embodiments, persons of ordinary skill in the art should appreciate that they can still make modifications to the technical solutions described in the embodiments or make equivalent replacements to some or all technical features thereof without departing from the scope of the technical solutions of the embodiments of this application. All such modifications and equivalent replacements shall fall within the scope of claims and specification of this application. In particular, as long as there is no structural conflict, the various technical features mentioned in the embodiments can be combined in any manner. This application is not limited to the specific embodiments disclosed in this specification but includes all technical solutions falling within the scope of the claims.

What is claimed is:

1. A module tray, comprising:
a tray body;
a reference member mounted on the tray body and configured for supporting and positioning a battery module in a first direction;
a sliding member slidably mounted on the tray body along the first direction and configured to clamp the battery module in cooperation with the reference member; and
an adjustment mechanism connected to the sliding member, wherein the adjustment mechanism is configured to drive the sliding member to move along the first direction and lock a position of the sliding member, and the adjustment mechanism is mounted on the tray body;
wherein:
two opposite sides of the tray body are each provided with a support fixture, each of the support fixtures being configured to support a side plate;
each of the support fixtures comprises two support blocks, each of the support blocks being provided with a plurality of accommodating grooves for accommodating a corresponding end of the side plate, and the two support blocks being configured to cooperatively support two opposite ends of the side plate; and
the plurality of accommodating grooves provided in the support blocks are configured to adapt to side plates of various models, and the plurality of accommodating grooves provided on at least one of the support blocks are different in length.

2. The module tray according to claim 1, wherein the sliding member comprises a support seat and a clamping block, the clamping block being mounted on the support seat, the support seat being connected to the adjustment mechanism, and the support seat being slidably mounted on the tray body along the first direction.

3. The module tray according to claim 2, wherein the sliding member further comprises a connection seat, the connection seat being mounted on the support seat, and the clamping block being detachably mounted on the connection seat.

4. The module tray according to claim 2, wherein the sliding member further comprises a support member slidably supporting the clamping block along the first direction, the support member being slidably mounted on the support seat, wherein a buffer is disposed between the support seat and the clamping block.

5. The module tray according to claim 4, wherein that the buffer comprises at least one of a spring, an elastic piece, and an elastic gasket.

6. The module tray according to claim 4, wherein the support member comprises a guide rod, wherein the support seat is provided with a sliding hole, the guide rod slidably runs through the sliding hole, and the clamping block is supported on the guide rod.

7. The module tray according to claim 6, wherein the sliding member further comprises a limiting member, the limiting member being configured to stop the support seat, and the limiting member being mounted at an end of the guide rod away from the clamping block.

8. The module tray according to claim 6, wherein a guide sleeve is slidably mounted on the guide rod, the guide sleeve being mounted in the sliding hole.

9. The module tray according to claim 1, wherein the sliding member is provided with a first avoidance groove on a surface facing the reference member, and the reference member is provided with a second avoidance groove corresponding to the first avoidance groove on a surface facing the sliding member.

10. The module tray according to claim 1, wherein the module tray further comprises an elongated seat, the elongated seat being configured to support the battery module, the elongated seat being mounted on the tray body, and the elongated seat extending along the first direction.

11. The module tray according to claim 1, wherein at least one of the support blocks is provided with an open groove for accommodating a bent edge of an end of the side plate, the open groove being in communication with the accommodating groove.

12. The module tray according to claim 1, wherein each of the support fixtures further comprises at least one middle block, the middle block is configured to cooperatively support a middle region of the side plate, and the middle block is provided with a positioning groove for insertion of the side plate.

13. The module tray according to claim 1, wherein the support fixtures on two opposite sides of the tray body are in rotational symmetry with respect to a central axis, the central axis being perpendicular to the tray body and running through a geometric center of the tray body.

14. The module tray according to claim 1, wherein the adjustment mechanism comprises a screw rod disposed along the first direction, a nut mounted on the screw rod, and support bases rotatably supporting two opposite ends of the screw rod, wherein the sliding member is connected to the nut, and the support base is mounted on the tray body.

15. The module tray according to claim 14, wherein an end of the screw rod is provided with a plug, the plug being configured to connect an external rotatable driving tool.

16. The module tray according to claim 14, wherein the adjustment mechanism further comprises a guide assembly, the guide assembly being mounted on the tray body, and the guide assembly being configured to support and guide the sliding member to move along the first direction.

17. The module tray according to claim 16, wherein the guide assembly comprises a guide rail mounted on the tray body and a sliding block slidably mounted on the guide rail, the sliding block being connected to the sliding member; or the guide assembly comprises a guide rod and a guide sleeve slidably fitting around the guide rod, the guide sleeve being connected to the sliding member, and the guide rod being supported on the tray body.

18. The module tray according to claim 1, wherein the reference member comprises a base and a reference block, the base being fixed to the tray body, and the reference block being detachably mounted on the base.

19. The module tray according to claim 1, wherein the module tray further comprises a clamping mechanism and two clamping plates, the clamping mechanism being configured to support and drive the two clamping plates to cooperatively clamp and fix the battery module, and the clamping mechanism being mounted on the tray body.

\* \* \* \* \*